Dec. 2, 1941.  E. P. GAILMARD ET AL  2,265,034
CONTROL FOR PHONOGRAPHIC RECORDS
Filed Nov. 20, 1936  4 Sheets-Sheet 1

Inventors:
Eugene P. Gailmard
Roger C. Johnson
By: Roger C. Johnson
Atty.

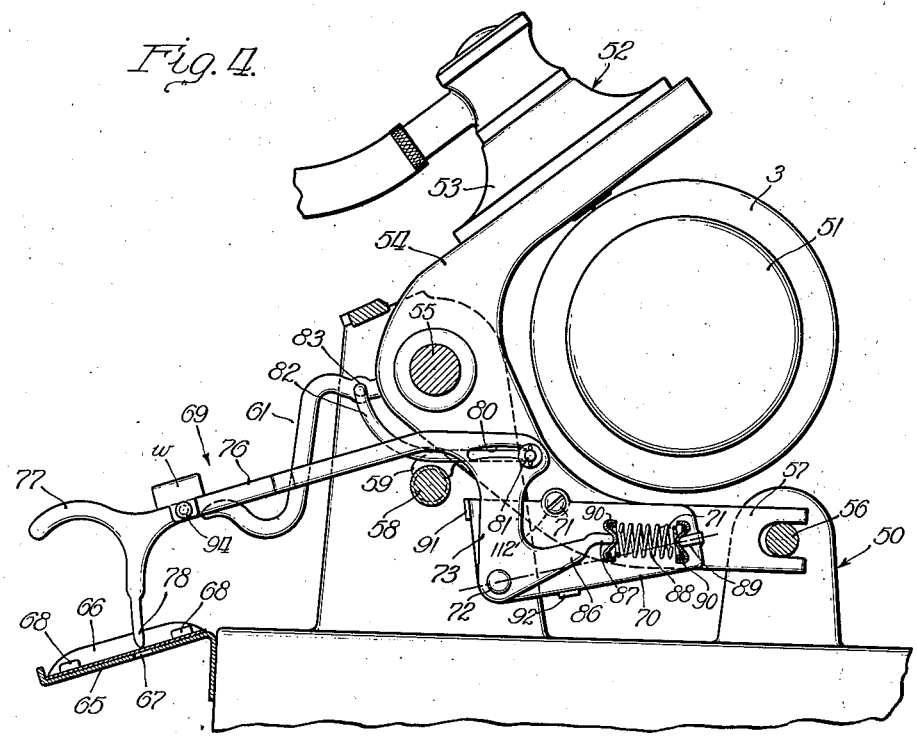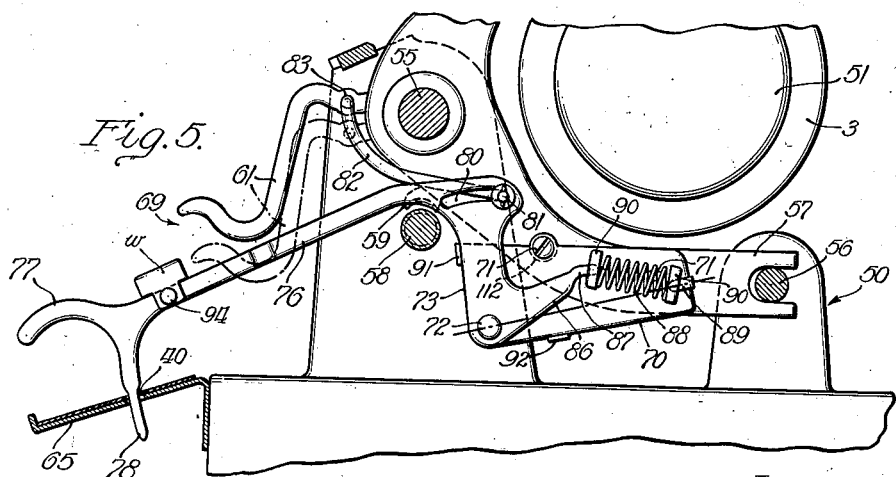

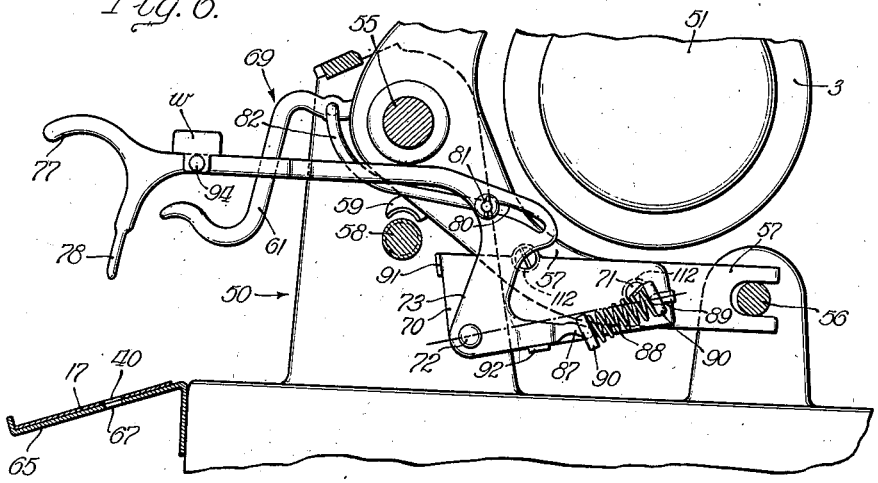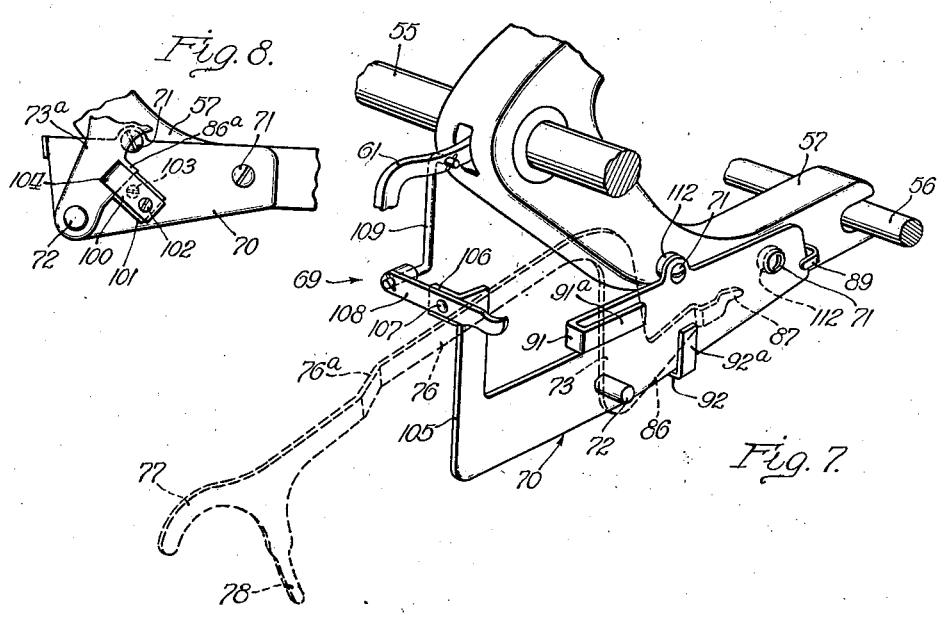

Dec. 2, 1941.  E. P. GAILMARD ET AL  2,265,034
CONTROL FOR PHONOGRAPHIC RECORDS
Filed Nov. 20, 1936  4 Sheets-Sheet 4
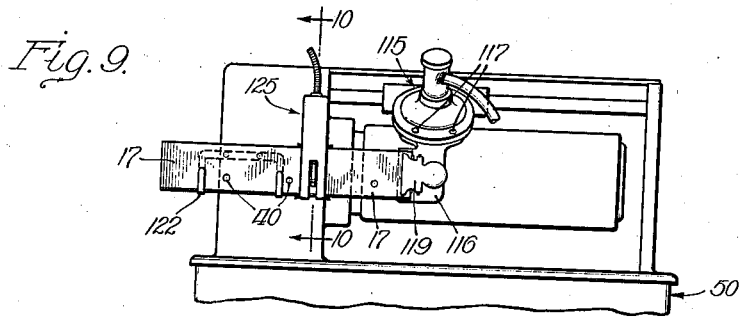
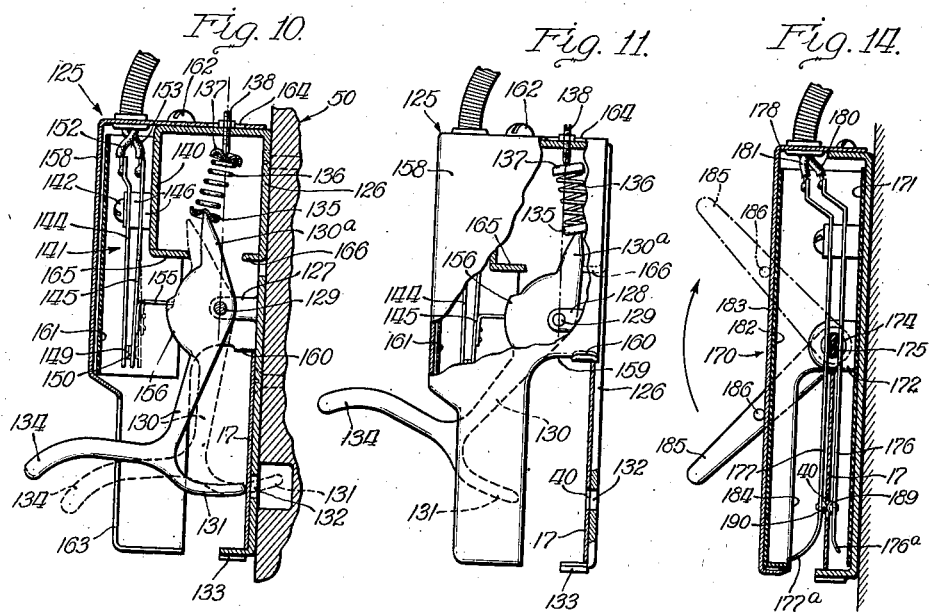
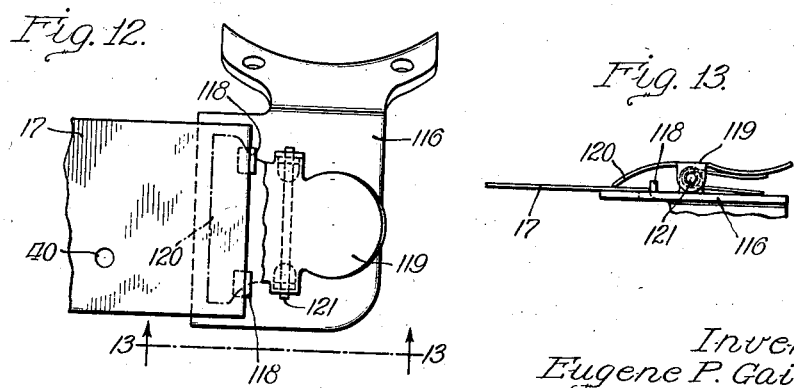
Inventors:
Eugene P. Gailmard
Roger C. Johnson
By: Roger C. Johnson
Atty.

Patented Dec. 2, 1941

2,265,034

UNITED STATES PATENT OFFICE 2,265,034

CONTROL FOR PHONOGRAPHIC RECORDS

Eugene P. Gailmard and Roger C. Johnson, Chicago, Ill.

Application November 20, 1936, Serial No. 111,829

12 Claims. (Cl. 274—17)

The present invention relates to commercial phonographic apparatus wherein matter to be written is recorded phonographically on a wax cylinder or the like by means of a recording machine and the wax cylinder or other record is then placed in a reproducing or transcribing machine, the operator listening to the reproduced dictation from the record and typing directly the matter heard therefrom.

In mechanical stenography of this type in use at the present time, each wax cylinder or record is accompanied by an indicator slip or the like having a scale corresponding to an indicator scale on the recording and reproducing machines, and the dictator marks on the slip such data as may be necessary for the operator to observe in transcribing, such as length of letters, number of copies to be made, and points at which insertions, corrections, or the like are desired.

When transcribing such dictation the operator or typist observes from the slip that a correction or insertion is to occur at a certain point on the cylinder and, just prior to reaching such indicated point on the cylinder she will, theoretically, cease typing and listen for the dictated change or correction, in order not to write past the point or include matter not wanted, or fail to include additional matter desired.

This procedure, as practiced with any presently known commercial recording and reproducing machines, is subject to several difficulties and objections, both from the standpoint of the dictator and of the stenographer, such difficulties being both technical and physical.

The recording of dictation to be reproduced for transcription to written form involves a peculiarly individual technique. There is a vast difference, for instance, in that type of recording and other recordings, such, for instance, as ordinary phonograph or "Victrola" recording. The latter is not intended to be reproduced for reduction to written form, but is to be "played" or reproduced repeatedly, in greatly amplified form, for purposes of entertaining or otherwise interesting a plurality of listeners, and must therefore be audible at a considerable distance, without the use of earphones or any other special equipment, whereas the reproduction of commercial dictation in ordinarily audible only to the operator typing the transcript, who wears a "head-set" or earphones connected to the reproducer sound box.

A further, and even more controlling difference, is that in "Victrola" recordings and the like for annunciator reproduction an absolutely faultless recording is essential, for there is no possible way to go back and make corrections or in anywise "patch up" such a recording. It must be inscribed on the record blank in unbroken sequence and, when completed, is either perfect or worthless. If imperfect in any respect it is simply destroyed and a new one made, and it therefore is quite frequently necessary to make several recordings in order to get one that is acceptable for the intended purpose.

The extreme opposite situation prevails in commercial recording, which is analogous to dictating to a stenographer writing shorthand. Such recordings are rarely ever perfect because they are almost invariably extemporaneous, the author composing his dictation as he proceeds. It inevitably follows that, during such dictation, just as when dictating to a stenographer, afterthoughts frequently occur, or the realization that some thought has not been properly expressed. The author may desire to entirely delete some part of his recorded dictation, or otherwise change it to better express his intended meaning. Any number of such things may arise to cause him to decide that a departure from his dictation as originally recorded is necessary or desirable.

When dictating to a stenographer it is a simple matter to take care of any such changes by merely instructing the stenographer as to the required departures from the original text. The stenographer makes any necessary notations and then makes the required changes when transcribing her shorthand notes. But in recording dictation on a record blank, to be reproduced for transcription by a typist, the flexibility of human response in such situations is completely lacking, and the prior art has never been able to provide a response or functioning of the machines in anywise analogous to the response of the stenographer in this respect. This has been a principal, recognized weakness or flaw in the attempt to reduce stenography to a mechanical basis, over all the years of the industry.

The difficulty resides in certain unavoidable fundamentals, both human and mechanical. First, the recording is, for the reasons set out above, rarely ever perfect. Next, if any change of any nature whatsoever be necessary, the subject-matter dictated on the record immediately assumes two distinct classifications, which may be characterized as primary and secondary recordings. The primary recording comprises the main text or theme of the matter to be written, and the secondary recording comprises the author's instructions to the typist as to changes, corrections, deletions and/or insertions to be made at certain specific points in the primary text. Obviously, both primary and secondary recordings are made on the same record blank, due to the fact that dictation has proceeded, in primary form, for a portion of the record, then a change for some part of that primary is dictated, as secondary matter, then primary recording resumed until another change became necessary, and so on. Such procedure, as above stated, parallels exactly that of dictating to a stenographer. It is the normal way—in fact the only way—to record dictation, for it would be out of the question to re-dictate every letter or other commercial recording in which a change was required.

Dictation thus recorded, however, does not readily lend itself to such reproduction that the typist will be able, without difficulty, to make a determinate written transcript, i. e., in the exact text and sequence desired by the author, as would be the case if the recording had been in shorthand. The recording, of necessity, is continuous, whether the recorded matter be primary or secondary. The reproduction for transcription can be only that which was recorded and exactly as recorded, even though the written transcript is required to differ therefrom in both text and sequence.

Thus it is seen that the transcribing operator is faced with the difficult task of making a transcript, in determinate text and sequence, of primary and secondary matter recorded indeterminately on a single record blank; that the position on the record of any primary part necessarily precedes, or is anterior to, the position on the record of the secondary matter which changes it, and that the secondary matter follows, or is in a position on the record posterior to that of the primary text which it is intended to change.

It is further and particularly to be noted that not all of the primary matter is to be typed in the written transcript, nor is all of the secondary matter to be included. The final, or end product (the written transcript), is to be made up of some part of the primary and some part of the secondary recordings—but not all of either.

To make it possible for the dictator to indicate to the typist where changes are to be made, and what change is desired, and for the typist to be able to determine these facts before typing or "running over" matter which is to be changed, has been a serious problem in the industry from its inception. It is to the elimination of this problem, in a definite and practical way, that the present invention is directed.

The physical difficulties mentioned occur in the actual manipulation of the mechanisms of the machines in endeavoring to meet the conditions above explained. First, the dictator, desiring to change or correct his verbiage or text, must change his physical position and reach over to the scale slip carried by his recording machine and mark thereon the point at which he begins dictation of the desired change. As a single cylinder will record quite a quantity of dictation there may be from two or three to a dozen or more such occasions arising during the dictation of a single cylinder. This means a loss of time, inconvenience, and even annoyance to the dictator, since he is repeatedly caused to change his posture in order to mark the indicator slip, to say nothing of the more serious matter of repeated interruption of his flow of dictation and the continuity of his trend of thought.

When the cylinder reaches the stenographer for transcribing, it is accompanied by the scale or index slip bearing the indicated correction points. While theoretically, as above stated, the stenographer will cease typing upon reaching such indicated points on the cylinder and "listen ahead" for the correction, in actual practice this is quite difficult to do, for the following reasons.

The stenographer is seated facing the typewriter; her reproducing or transcribing machine is usually positioned on a stand alongside of her chair. The index slip bearing the correction indications may be placed on her reproducing machine, on her desk, in front of her, or otherwise, as best suits her convenience, the object being that she may see and note the points at which corrections are indicated. Actually, however, the correction or indication slip is of little or no value to her under present practices, for the reason that, regardless of where the slip is placed, the cylinder to which it corresponds must be on the reproducing machine. Therefore, regardless of what the slip may show, she cannot know definitely when she is about to reach a correction on the cylinder without consulting the scale on her reproducing machine. In other words, the paper slip tells where to look for corrections, but she must more or less constantly watch her reproducing machine scale to locate them.

It is to be noted that the reproducing machine, in its normal position on a stand alongside of the operator, is a full 90° or more out of her line of vision as she faces her typewriter. She cannot, therefore, see the cylinder scale pointer on the machine without turning away from her typewriter. As it is extremely difficult to type accurately unless in a sitting posture directly facing the typewriter, she is thus forced to stop typing every time she wishes to turn and look at the indicator on the machine. As a consequence, one of two results in inevitable. She either loses much typing time stopping to see when she is about to reach an indicated correction, or else she reaches and runs past the point at which the correction should have been made, before realizing it, and is then forced to stop and make erasures or, quite frequently, type the entire page over again. In either event, considerable inconvenience and loss of time is unavoidable.

The present invention has for its principal object the provision of a method of and means for eliminating the above difficulties by, first, making it possible for the dictator to instantaneously indicate desired corrections or changes in his dictation, without so much as changing his posture or ceasing his flow of dictation, and, second, automatically compelling the operator's attention to such indications in due time, i. e., before reaching the point at which the correction is actually dictated. According to the present invention, this is accomplished without the operator having to turn out of position to examine the reproducing machine scale or, in fact, pay any attention at all to the machine. She is thus enabled to give complete attention to listening and typing, without risk of missing or overrunning the corrections, thus materially increasing efficiency and production.

Another object of the present invention is the provision of remotely controlled means on a recording machine for indicating changes, corrections or insertions to be made at any particular point in the recorded matter. Similarly, this means may be used to indicate beginning or ending or points of change in letters, memoranda, or any other recorded matter. In the case of letters, or other dictated matter, the stenographer is able to prejudge the approximate length thereof and to properly space or position the typed matter on the page. The indexing means of the present invention may, in fact, be used to indicate any point or points in a recording to which it is desired to compel particular attention when transcribing or otherwise reproducing.

It is particularly an object of the present invention to provide such indexing or marking means, operative either electrically or mechanically, conveniently and easily by the dictator, without interruption of his trend of though or flow of dictation. Heretofore it has been necessary for the dictator to make such indications manually on the indicator slip, as by pencil check marks, or some other means. Such manual operation obviously necessitates the cessation of dictation, interruption of thought trend, and repeated movement or shifting of the hands, arms, or body posture, resulting in considerable inconvenience and loss of time to the dictator.

A further object of the present invention is the correlation of such indications, produced on a recording machine, whether a dictation recorder or some other type of sound recording mechanism, with means on the reproducing machine whereby the operator is automatically and positively apprised of the proximate point at which such change, correction or insertion is desired. Preferably, the index responsive unit on the reproducer is actuated in advance of the reproducing means reaching that particular point in the recorded matter. This is an especially important feature in mechanical stenography.

Another object of the present invention is particularly concerned with mechanical stenography and comprehends the provision of means on the recorder, or dictating machine, whereby, upon operating a button or other part mounted in a convenient place, as on the handle of the speaking tube, a hole or notch will be punched in the paper scale or index slip, indicating that a correction or insertion is desired at that point, in connection with means on the transcribing or reproducing machine in the nature of a feeler, or finger, so that when the perforated correction slip is fastened in place on the reproducing machine relative movement occurs between the slip and the feeler, which movement is equal or proportional to the movement of the reproducing needle along the surface of the wax cylinder, until the feeler reaches the hole or notch in the paper. It should be particularly noted that in the preferred embodiment of the invention the feeler finger is arranged to travel in advance of the position of the reproducer needle on the cylinder, and therefore reaches the index in the slip before the reproducer needle reaches the matter on the cylinder which is to be changed. When the feeler or finger drops into this index hole its motion is translated, through suitable means, either electrical or mechanical, into a movement of a part or means that temporarily but positively stops further reproduction from the record, by any suitable means, as by interrupting the drive from the motor of the reproducing machine to the record-carrying mandrel, lifting the feed nut off of the feed screw, or lifting the reproducing needle off of the record. As no reproduction or dictation is then coming through the earphones, the stenographer is compelled to cease typing, thus making it impossible for her to inadvertently run past the correction point.

Still another object of the present invention is the provision of means making it possible for the operator to temporarily disable the index responsive finger and for the reproducing machine to resume operation, so that the operator may listen to the dictation following, make the correction or other change called for, and continue until such time as the finger has gone beyond the index notch or hole. The finger can then be restored again, at will, in operative relation to the index slip, so as to be ready to again stop the reproduction upon occurrence of another indexed correction indication.

An important object of the present invention is to provide a method and means whereby an imperfect recording, composed of primary and secondary parts recorded indeterminately on a single record blank, the secondary parts comprising instructions for changes to be made in the primary parts, may be so controlled in the reproduction thereof as to greatly facilitate the making of a determinate written transcript.

Further objects and advantages of the present invention will be apparent to those skilled in the art upon consideration of the following detailed description, taken in conjunction with the accompanying drawings, in which:

Figure 4 is an end view, partly in section, of a conventional reproducing machine equipped with mechanism movable with the reproducing sound box carriage and arranged to control the position of the feed nut on the sound box carriage in response to indicia made on the index slip by the dictator;

Figure 5 is a view similar to Figure 4, but showing the index responsive finger in tripped position and the feed nut controlling lever in a position disengaging the feed nut from the feed screw;

Figure 6 is a view, also similar to Figure 4, but showing the index responsive finger in inoperative position, so as to provide for reproduction until the finger has passed beyond an index on the indicator slip;

Figure 7 is a perspective view of a modified form of the present invention, showing a slightly different form of connection between the indicia responsive means and the feed nut controlling lever;

Figure 8 is a modified form of means for temporarily holding the index responsive finger in inoperative position;

Figure 9 is a modified form embodying the principles of the present invention and illustrating an arrangement wherein the indicator slip is moved relative to a stationary index responsive mechanism arranged to control an electric switch that in turn is adapted to stop reproduction when the index responsive mechanism reaches an index;

Figure 10 is an enlarged sectional view taken along the line 10—10 of Figure 9;

Figure 11 is a sectional view similar to Figure 10 but showing the parts in a different position;

Figure 12 is an enlarged view of the slip holding means on the reproducer carriage;

Figure 13 is a view taken along the line 13—13 of Figure 12; and

Figure 14 is a modified form of index responsive unit.

Figure 1:
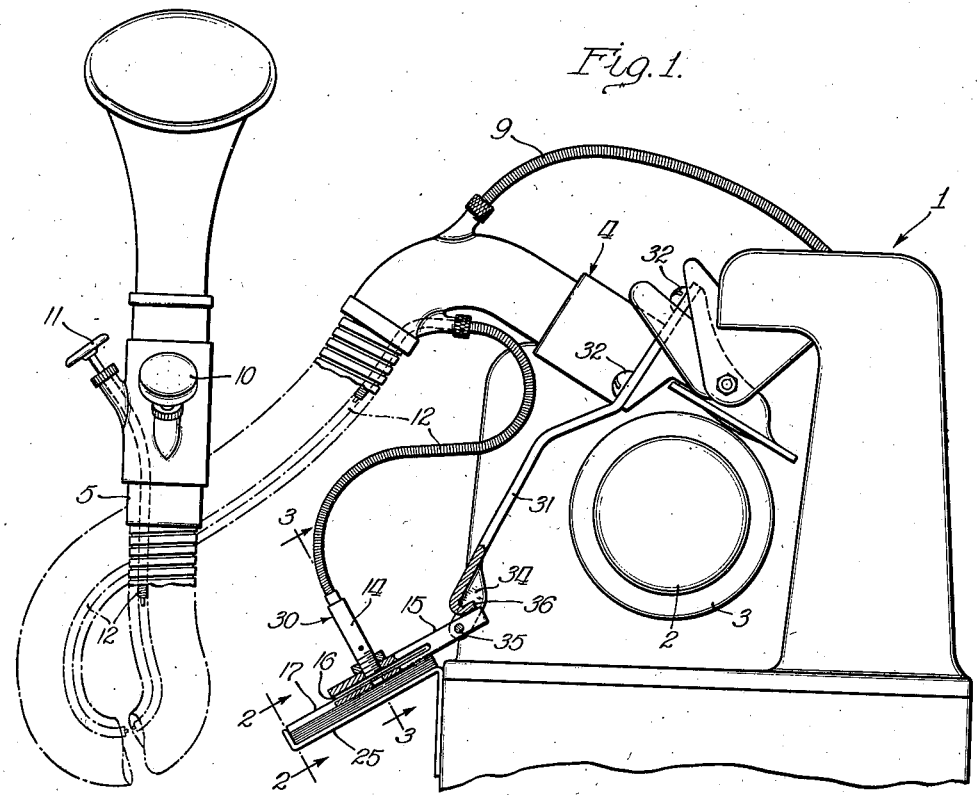
Figure 1 is a view of a conventional recording machine equipped with remotely actuated means for making an index on a correction slip.
Figure 2:
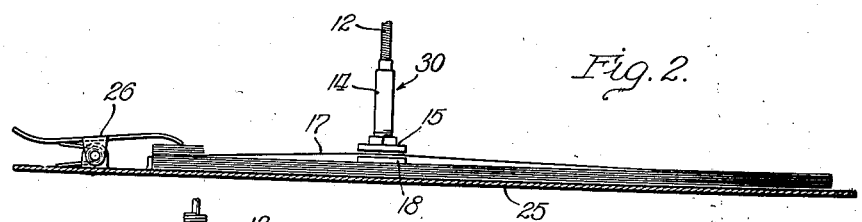
Figure 2 is a sectional view taken along the line 2—2 of Figure 1.
Figure 3:
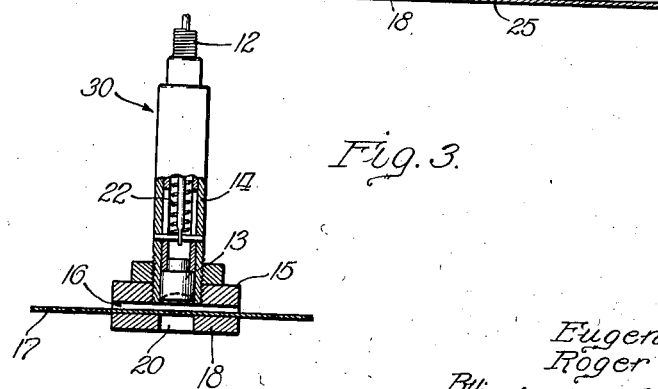
Figure 3 is a sectional view taken along the line 3—3 of Figure 1.

Referring now to Figure 1, the dictating machine is indicated by the reference numeral 1 and includes a mandrel 2 upon which a wax cylinder 3 is mounted for rotation therewith. The recording unit 4 includes a needle which is vibrated by a diaphragm in accordance with the matter dictated through the speaking tube 5. Starting and stopping of the revolution of the mandrel 2 and cylinder 3 in the conventional machine is controlled by a Bowden wire 9, actuated by a push button 10 mounted in any suitable position on the handle of the speaking tube 5. According to the present invention, a second push button 11 is mounted on the speaking tube 5 in any suitable position, preferably adjacent the push button 10, where the dictator will have to release the running clutch button 10 before operating the button 11. This button 11 is connected with a second Bowden wire 12 (Figures 1 and 2) to operate a plunger 13 (Figure 3) mounted for reciprocation in a tubular support 14 that is fastened in any suitable manner to an indicator slip receiving member 15. The member 15 is provided with a slot 16 in which the indicator slip 17 may be disposed, as will be pointed out below, and the lower arm 18 of the member 15 has an opening 20 in axial alignment with the punch or plunger 13 normally held in retracted position within the tubular support 14 by a spring 22, but which may be actuated by the push button 11 and Bowden wire 12 to punch a hole in the indicator slip 17. The indicator slip 17 is adapted to be supported in fixed position on the recording machine 1 by any suitable means, such as a metal plate 25 fixed to the frame of the machine and provided with a clip 26 which holds the slip 17, or a pad of such slips, in position.

The indexing unit, which is indicated in its entirety by the reference numeral 30, and which includes the punch 13 and associated parts, is supported in a position to embrace one of the slips 17 and to move therealong with the recording unit 4 as the latter is advanced along the wax cylinder 3. For this purpose an arm 31 is fixed, as by screws 32, to the recording unit 4 and extends downwardly and forwardly toward the indicator slip support 25. At its lower end the arm 31 has a pair of ears 34 that are apertured to receive a hinge pin 35 or the like by which the member 15 is pivotally connected to the arm 31 at the lower end thereof. The arm 31 carries suitable stop means 36 which prevents the indexing unit 30 from swinging downwardly about the hinge 35 very far beyond the position shown in Figure 1, but the unit may be swung upwardly so as to facilitate the disposal of a pad of indicator slips 17 in position on the support 25. The stop 36 may be arranged to permit the member 15 to ride along on top of the pad of index slips 17.

The operation of the indexing unit 30 is believed to be clear from the above description. Before dictating on the cylinder 3, the dictator will dispose an indicator slip 17 in the slot 16, as indicated in Figure 1. As the recording unit is advanced along the cylinder 3 by the feed screw of the machine 1, the indexing unit 30 will, at the same time, be advanced along the indicator slip 17. At any point that the dictator desires to make an indication of a correction, insertion, or the like, all he has to do is to depress the indexing push button 11. The button 11 is disposed adjacent the conventional push button 10 which controls the clutch of the recording machine 1, and preferably the button 11 is placed close enough to the button 10 so that it can be operated by the same thumb or finger as used by the dictator to operate the button 10, but the spacing between the buttons 10 and 11, according to the principles of the present invention, is such that it will be necessary for the dictator to release the button 10, thereby stopping the forward travel of the recording unit 4 before depressing the index button 11. Pressing on the button 11 will project the punch or plunger 13 through the slip 17, forming a notch or hole 40 at a point corresponding approximately to the point on the wax cylinder 3 at which the desired change or correction is to be made. After the dictator has made the desired index on the slip 17 he will release the button 11 and can then resume dictation by depressing the button 10 in the usual manner.

Optionally, the hole punched by the part 13 might be in the nature of a slit, say arranged longitudinally of the slip 17, in which case it would not be necessary to stop the recorder to make an index, and the button 11 may be placed in any convenient location.

To make an indication on the slip 17 in the above manner does not require the dictator to alter his position, or perform any act that would tend to interrupt his trend of thought, and since the button 11 can be operated quickly, easily and conveniently, there is no appreciable loss of time or interruption of the flow of dictation.

Referring now to Figures 4, 5 and 6, a transcribing or reproducing machine is indicated in its entirety by the reference numeral 50, and includes a cylinder receiving mandrel 51 and a reproducing unit 52. The latter includes a sound box 53 supported on a carriage 54 that is movable along fixed guide means 55 and 56 as in conventional practice, the latter cooperating with a downwardly extending guide arm 57. The machine 50 is provided with a feed screw 58 with which a shiftable feed nut 59 cooperates. The feed nut 59 is movably supported on the reproducer carriage 54 and when brought into engagement with the feed screw 58 serves to advance the reproducer carriage 54 along the cylinder 3 which contains recorded dictation to be transcribed. The feed nut 59 is controlled by a lever or arm 61 through suitable mechanism (not shown), and in one position of the lever 61 the feed nut 59 is lowered into operative engagement with the feed screw 58 for advancing the carriage 54, as mentioned above, and the lever 61 may be shifted into an upper position, shown in full lines in Figure 5, which serves to lift the feed nut 59 out of engagement with the feed screw 58, whereupon travel of the reproducer carriage 54 will be interrupted.

The present invention is not concerned with the particular details per se of the reproducing machine, but the present invention is concerned with the provision of means, responsive to one or more indices made by the dictator during the recording of his dictation on the cylinder, for temporarily terminating reproduction from the cylinder 3.

An indicator slip supporting plate 65, which may be similar in construction to the supporting plate 25 shown in Figure 1, is mounted on the machine 50 and is provided with a clip 66 or other means for holding the indicator slip 17 that accompanies the cylinder 3. The supporting plate 65 is also provided with a slot or recess 67 extending substantially the length thereof. This slot or recess 67 is disposed in such a position as to be underneath any of the indices punched in the slip 17 by the indexing unit 30 (Figure 1), and in order to insure that the slip 17 will be in proper position the supporting plate 65 is provided with suitable stop lugs 68 (Fig. 4) or the equivalent thereof against which one end of the slip 17 is disposed.

The index responsive unit is indicated in its entirety by the reference numeral 69 and includes a bracket 70 which is fixed, as by screws 71, in a suitable position on the reproducer carriage 54, as to the downwardly extending guide arm 57, and carries a pivot 72 upon which a feeler arm 73 is mounted. The feeler arm 73 includes an elongated section 76 having a handle 77 and a feeler finger 78 disposed in a position to overlie the slot 67 in the slip support 65, and in a position to fall into any hole or holes punched in the slip 17 by the indexing unit 30 (Figure 1). A slot 80 is formed in a part of the arm 73 and receives the out-turned end 81 of a link 82, the opposite end of which is engageable, as at 83, in a hole or other suitable means on the feed nut controlling hand lever 61. An end 86 of the lever 73 extends rearwardly and has a pointed portion 87 serving as a pivotal support for one end of a toggle spring 88, the other end of which is supported by a similar pointed portion 89 (Figure 6). The ends of the spring are carried for pivotal or rocking action on the points 87 and 89 by ferrule-like members 90, and stops 91 and 92 on the bracket 70 limit the swinging of the lever or feeler arm 73.

As best shown in Figure 4, the relation between the points 87, 89 and the pivot 72 is such that when the lower end of the feeler finger 78 rides along the paper slip 17 the point 87 is slightly above a line joining the pivot 72 and the pivotal support 89 for the spring 88, so that there is a positive bias exerted by the spring 88 tending to swing the arm 73 in a counterclockwise direction about the pivot 72. This tendency is resisted by the engagement of the finger 78 with the portion of the slip 17 overlying the slot 67, but by virtue of the position of the parts at this time, as shown in Figure 4, the effective force of the spring 88 is not sufficient to cause the point of the feeler finger 78 to penetrate the slip. However, when the feeler reaches a hole already punched in the paper, it then drops through the hole, under the influence of the spring 88, and is moved against the stop 91, (Figure 5), thus raising the lever 61 and lifting the feed nut 59 off of the feed screw 58. This automatically lifts the reproducing needle off of the wax cylinder, leaving the mandrel and cylinder rotating idly. No sound is reproduced, as there is no contact between the reproducing needle and the surface of the cylinder, nor between the feed nut and the feed screw, and therefore there can be no forward travel of the diaphragm unit 52. This automatically furnishes the stenographer or typist with positive notification that a change or insertion is impending and she is thus forced to cease typing until she throws the index responsive means temporarily into inoperative position and momentarily resumes reproduction as pointed out below.

It is important to note that when the finger 78 finds a hole in the slip and begins to move therethrough, the point 87 on the arm 73 moves upwardly (see Figure 5), thereby materially increasing the effective leverage through which the spring 88 acts in raising the feed nut 59. Thus, by virtue of this toggle action, the spring 88 can be made strong enough to lift the feed nut 59 but, particularly in the position shown in Figure 4, the strength of the spring 88 is not sufficient to cause the feeler finger 78 to tear the paper.

As above described, whenever the finger 78 reaches a hole in the indicator slip 17, rotation of the mandrel and cylinder continues idly, but forward movement of the diaphragm carriage unit 52 is instantaneously stopped by the raising of the feed nut off of the feed screw, the reproducing needle is simultaneously disengaged from the surface of the cylinder 3, and therefore reproduction and transcribing have to stop. It is now necessary for the operator to locate and make the required correction or insertion, and in order to continue with the reproduction it is necessary to replace the feed nut 59 on the feed screw 58 and the reproducing needle on the cylinder surface. This may be done by first lifting the arm 73 upwardly beyond the position shown in Figure 4 and into a third or inoperative position, as shown in Figure 6, and then, with the feeler arm 73 in this position, the operator can lower the hand lever 61 from its inoperative position (Figure 6) to its operative position (Figure 4) without interfering with the lever 73, since the inner end 81 of the link 82 merely moves backwardly in the slot 80. The link 82 and slot 80 thus serve as lost motion means permitting the hand lever 61 to restore the feed nut 59 to its operative position engaging the feed screw 58.

It is to be noted that in the position of the lever 73 in Figure 6 the spring 88 exerts a force tending to hold the arm 73 in its inoperative position, this being done to permit the finger part 78 to pass over the punched index hole in the slip 17 and to permit the operator to hear and make the necessary correction. The spring 88 urges the arm 73 downwardly in a clockwise direction about the pivot 72, but this motion is limited by the lower stop 92 formed on the supporting plate or bracket 70. The length of the slot 80 is such as to permit the arm 73 to be moved into its inoperative position while at the same time accommodating the upper or inoperative position of the manual release lever 61. After the correction has been noted and completed, and if the finger 78 has by this time passed the index hole that initially terminated reproduction and the operator is again ready to proceed, it is necesary only to push the feeler finger section 78 down against the paper slip 17, the parts resuming the position indicated in Figure 4. The transcribing operation now continues in the usual manner until the feeler section 78 reaches another index hole, when the machine is again automatically disabled and the procedure above described is repeated.

If desired, a weight W may be mounted on or incorporated with the arm 73 to furnish additional force to raise the manual feed control lever 61, and if desirable the weight W may be made adjustable along the arm 76, as by a set screw or other fastening means 94. This arrangement has the advantage that the weight W is at a considerable distance from the pivot 72 and can therefore exert sufficient force to shift the control lever 61 and associated parts but without causing the finger 78 to bear hard enough on the paper slip 17 to tear the same. If desired, the toggle spring 88 can be eliminated, and the weight relied upon entirely, but in this event some means, such as a spring similar to but lighter than spring 88, or other mechanism, should be provided in order to hold the arm 73 in its inoperative position (Figure 6) to permit passing the zone of correction by the feeler 78. For example, referring to Figure 8, a resilient clip 100 may be fastened to a block 101 by any suitable means, such as a screw 102, and the block may be fastened to the bracket 70 by a screw 103. The spring 100 has a resilient gripping section 104 in a position to receive the inner portion 86a of a feeler arm 73a when the latter has been raised into its inoperative position, the arm 73a being provided with a weight W, in the manner indicated in Figures 4 to 6, sufficient to raise the feed nut control lever 61 when the feeler portion of the lever 73a encounters an index hole in the indication slip 17.

Instead of connecting the feeler arm 73 with the feed nut control hand lever 61 by means of a thrust link 82, the bracket 70 (Figure 7) may be provided with an extended section 105 with a lug 106 which carries a pivot pin 107 upon which a short lever 108 may be mounted. One end of this lever is positioned to be engaged by a portion of the arm 73 while the other end is connected by means of a short link 109 with the manual control lever 61 or other controlling part of the reproducing mechanism. If desired, of course, the lever 108 may be so positioned that the left hand end (Figure 7) may engage directly the lever 61 by extending the bracket part 105 upwardly and connecting the lever 73 with the lever 108 in any suitable manner, as by a link or a direct connection. From Figure 7 it will be noted that the lever 73 is preferably disposed at one side up against the bracket 70, and preferably suitable spacers 112 are disposed between the latter and the carriage arm 57 so as to provide sufficient clearance for the link 82 when it is used as shown in Figures 4, 5 and 6. If desired, the stops 91 and 92 may carry extensions 91a and 92a embracing the lever 73 and serving to prevent any lateral displacement thereof. These may be provided in the construction shown in Figs. 4, 5 and 6.

In the mechanism described above the index responsive device is arranged to be moved with the reproducer carriage, with the index slip held in a stationary position on the reproducing machine. If desired, of course, these relations can be reversed,—that is, the indicator slip can be moved as the reproducer carriage travels across the record, and in that event the index responsive device would be arranged in a stationary position on the machine.

An arrangement of this sort is illustrated in Figures 9 and 12, in which the reproducing machine 50 is illustrated as having a diaphragm unit 115 to which an index slip receiving bracket 116 is fixed as by screws 117 or any other suitable means. The bracket 116 carries positioning lugs 118 similar to the lugs 68 described above, and a clamping member in the form of a spring biased clip 119 having an end 120 adapted to clamp or fix one end of the correction indicator slip 17 in place on the bracket 116, with the end thereof up against the positioning lugs 118. Preferably, spring clip or clamping member 119 is hingedly mounted, as at 121. As will be obvious, when the index slip 17 is held in place on the bracket 116 by the clamp 119, it will be moved laterally as the reproducer head or diaphragm unit 115 travels along the cylinder 3. A wire clip 122 may be provided on the machine 50 to serve as a support for the free end of the slip 17.

Where the index slip is moved with the reproducer unit, the index responsive means is preferably arranged as a stationary part of the machine. In Figure 9 we have shown an electric index responsive unit, indicated in its entirety by the reference numeral 125, which is fixed to the machine 50, preferably adjacent the position of the reproducer unit in its initial starting position. The index responsive unit 125 is best shown in Figure 10, and includes a base or bracket member 126 adapted to be fastened to a part of the machine 50 by any suitable means, such as screws or the like. The base or bracket 126 has a pair of apertured ears 127 and 128 (Figures 10 and 11) which receive a pin 129 upon which a pivoted lever 130, preferably formed of a suitable dielectric material, is mounted. The lever 130 has a finger or feeler portion 131 which overlies an opening 132 formed in the lower portion of the base member 126, the lower end of the latter terminating in an end 133 which serves as a flared guide for the slip 17, as will be referred to later. A finger piece 134 is formed on or carried by the lever 130 at the end thereof adjacent the feeler portion 131, and the other end 130a of the lever 130 is pointed and carries a ferrule-like member 135 against which one end of a spring 136 bears. The other end of the spring is disposed against a similar ferrule-like member 137 disposed on a pin or stud 138 fixed, preferably adjustably, to the base member 126 opposite the end 133. The members 135 and 137 are substantially the same as the members 90 referred to above.

The base member 126 includes a bent section 140 on which an electric switch unit 141 is mounted in any suitable manner, as by a screw 142. The switch unit embodies two resilient members 144 and 145, supported in insulated relation with respect to each other and with respect to the base 126, as by insulating blocks 146. Contact points 149 and 150 are carried at the outer ends of the spring members 144 and 145, and the latter are biased so as to take a position in which the points 149 and 150 are separated, as indicated in dotted lines in Figure 10. Conductors 152 and 153 lead to any suitable electrical means for controlling the operation of the reproducing machine, as to a conventional magnetic unit for starting and stopping the rotation of the record-receiving mandrel.

The outer end of the inner spring member 145 is bent or carries a lug, as at 155, and engages a cam portion 156 of the index responsive lever 130, and in the full line position the parts are so constructed that the points 149 and 150 are held in engagement so as to provide for operation of the reproducer. A cover 158 encloses the switch mechanism and the major portion of the lever 130. The cover has its sides notched, as at 159, and adjacent the inner portion of the notch each side is provided with a flared projection 160 which cooperates with the flared end 133 on the base in permitting the index slip 17 to be drawn easily through the index responsive unit 125. Preferably the switch mechanism is also enclosed by an insulated jacket or housing 161. The cover is held in place by any suitable means, such as a screw 162 threaded into the upper portion of the base bracket 126, and the cover is slotted, as at 163 and 164, to accommodate the finger portion 134 of the lever 130 and the adjustable stud 138 for the toggle spring 136.

The operation of the mechanism shown in Figure 9 is substantially as follows: The correction slip 17 accompanying the cylinder 3 is placed in a reversed position (see Figure 4) with its inner end clamped in position on the bracket 116 and up against the positioning lugs 118, with the adjacent portion of the slip lying within the notch 159 over the opening 132 in the base 126. The operator will then bring the feeler portion 131 of the lever 130 down against the slip. In this position of the lever 130 the contacts 149 and 150 remain in engagement and the relation between the inner end 130a of the lever 130, the pivot pin 129, and the spring anchor 138 is such that the end of the spring, at 135, lies a short distance above a line joining the points 129 and 138. The spring 136 thus exerts a relatively small but positive force tending to swing the index responsive lever 130 in a counterclockwise direction (Figure 10) about the pivot 129. As reproduction proceeds, and the reproducer carriage 115 travels along the cylinder 3, the bracket 116 moves with the reproducer unit 115 and draws the index slip 17 across or through the unit 125. When the portion of the slip 17 having an index hole punched therein comes underneath the end of the finger section 131, the spring 136 swings the lever in a counterclockwise direction, which is permitted by the fact that the finger 131 passes through the punched hole in the slip 17 and the registering hole 132 in the base 126. This causes a movement of the cam portion 156 into its dotted line position in Figure 10 and permits the points 149 and 150 to separate, which interrupts the flow of current and stops further reproduction, as by disconnecting the mandrel from the motor of the reproducing machine. Where it is necessary that the contacts 149 and 150 be brought into engagement from a normal separated position whenever the finger 131 reaches a punched hole in the slip 17, the position of the cam 156 relative to the switch blade spring 145 is reversed from the position shown in Figure 10. The lever 130 is limited in this movement by any suitable means, such as by having a portion of the lever engage the inwardly bent end 140 of the base 126, as indicated at 165. A lug 166 on the base 126 limits the movement of the lever 130 in the other direction, as shown in Figure 11.

When reproduction by the machine 50 is thus terminated, the operator knows that a correction or change is about to be dictated. In order, however, to reach the dictated correction or change, it is necessary for the operator to bring the machine into operation so as to listen ahead to the succeeding dictation. To do this, according to the present invention, all the operator has to do is to move the lever 130 from the position shown in full lines in Figure 10 to the position shown in Figure 11, in which the inner end of the lever is moved to a position below a line joining the pivot pin 129 and the anchoring pin 138, so that the spring 136 now acts to hold the lever 130 in this inoperative position. Nevertheless, in the construction shown in Figure 10, the contact points 149, 150 are brought into engagement so as to again connect the motor to the driving mechanism, or otherwise resume reproduction. After listening ahead, the operator makes the required changes or corrections, during which time the advance of the reproducer carriage 115 will draw the index slip 17 a distance sufficient to move the index, to which the device 125 has just responded, beyond the finger 131. As soon as this occurs the operator can then place the unit 125 back into operation by moving the lever from the position shown in Figure 11 to the position shown in dotted lines in Figure 10, in which the finger or feeler section 131 is again brought into engagement with the slip and ready to move into the next index hole encountered, the position of the inner end of the lever 130 being now such that the spring 136 biases lever 130 for movement in a counterclockwise direction, as explained above.

A simplified form of electrical index responsive unit is shown in Figure 14. This unit, indicated in its entirety by the reference numeral 170, may be used in place of the unit shown in Figures 9, 10 and 11, and includes a base or bracket 171 adapted to be fastened in any suitable manner to the reproducer 50, preferably in the same way as the unit 125 shown in Figure 10. Extending outwardly from the base is a pair of ears 172 which are apertured to receive a rotatable cam member 174 formed of dielectric material and having a flat intermediate section 175 that is disposed between a pair of spring contact members 176 and 177 secured in insulated relation to the base 171 by a screw 178. Leads 180 and 181 extend from the members 176 and 177, respectively, to any suitable control for the reproducer. An insulating jacket 182 is carried on the base 171 and surrounds the members 176 and 177. The base 171 carries a cover 183, similar to the cover 158, which is notched as at 184 to accommodate an index slip 17, and one end of the member 174 extends outside the cover and fixedly receives an operating arm 185 carrying a stop 186 cooperating with the cover 183 to limit the movement of the member 174. The ends of the spring members are flared, as at 176a and 177a to facilitate the insertion of a slip 17 therebetween, and the members 176 and 177 carry contacts 189 and 190 and are biased so that whenever a punched index 40 on the slip 17 reaches the members 176 and 177 the contacts 189 and 190 are engaged and close a suitable circuit to stop the reproducer, the members 176 and 177, or either of them, thereby serving as finger or feeler means responsive to an index 40 for temporarily terminating reproduction. In order to then proceed, the operator throws the arm 185 upwardly and this turns the flattened section 175 at right angles to the contacts 189 and 190 and separates the latter to permit the reproduction to continue. After the index 40 has been moved beyond the unit 170 the latter is restored to operative position by throwing the lever 185 back to its full line position.

During the recording of dictation, any change or correction in the dictated matter necessarily relates to matter that has already been dictated and is therefore spaced further along on the recording cylinder than the matter to which it refers. As a rule this spacing is only a matter of a few revolutions of the cylinder, or a few points on the indicator scale, but sometimes it may carry the matter back as much as a sentence or two preceding the point or position of the recording needle on the cylinder at the time the correction is dictated.

To provide for this difference in spacing, according to the principles of the present invention, the relation between the index forming means on the recorder, and the correction slip holding means and index responsive unit on the reproducing machine, is such that the index responsive unit will be actuated, in practically all cases, before the point on the record where the dictated change or correction occurs is reached by the reproducing unit.

This may be done by suitable adjustment of either the indexing or of the index responsive means. For example, the indexing unit 30 on the recorder may be offset a predetermined distance backwardly, or in a direction opposite to its direction of travel, from a position of alignment with the recording needle. Thus, during reproduction, the index responsive device would be actuated a short time before arrival of the reproducing needle at the point on the cylinder where the correction was dictated.

On the other hand, the indexing unit 30 on the recording machine could be positioned in alignment with the recording needle, so that the index made by the indexing unit would, so far as advance of the slip is concerned, be in exact alignment with the beginning of the dictation of the correction or change on the cylinder. In such event the index responsive unit on the reproducing machine would be offset in the forward direction, that is, in the direction of travel of the reproducer head, so that the feeler or finger, 78 or 131, or the members 176 and 177, would reach the correction index before the reproducing needle would actually arrive at the point where the correction was dictated.

Still further, the same result could be accomplished by positioning the index slip holder 25 on the recording machine, or the slip holder 65 on the reproducing machine, in offset relation to the cylinder receiving mandrel of the respective machines. In the first case, the slip holder would be offset a distance in the direction of travel of the recording unit, and in the second case the slip holder would be offset in a direction opposite to the direction of travel of the reproducing unit. In similar manner, the same effect or offset relation could be secured in the construction shown in Figure 10 by properly positioning the bracket 116 and the index responsive unit 125.

In the preferred construction, the indexing punch is aligned with the recording needle and the index responsive units 69 and 125 arranged to meet the index before the reproducing needle reaches the dictated matter to be revised. This is done by displacing the finger end of the lever 73 to the right a small amount, as by bending the lever 73 at 76a, and by disposing the lugs 118 (Figures 12 and 13) on the bracket 116, and the unit 125, in the proper position so that the unit 125 will be, relative to the slip 17, ahead of the reproducing unit 115 in its position along the cylinder.

From the foregoing it will be obvious that manufacturing preferences in mechanical expedients may be observed, so long as the fundamental object of the present concept is attained, namely, that the operator be definitely and positively apprised of the proximate point of occurrence of a dictated change or correction in advance of the arrival of the reproducing needle at such point.

From the foregoing it will also be obvious that, in attaining the stated fundamental object of the present concept, certain new and important results are attained, as follows:

(a) Complete correlation of the functions of the two machines to secure a desired unitary result;
(b) Greatly improved convenience and facility of operation of both machines;
(c) Control of reproduction on the second machine vested in the dictator using the first machine;
(d) Substantial elimination of chance of error in transcribing;
(e) The saving of considerable time for both the dictator and the stenographer.

Each and every one of these highly desirable results is accomplished by means and method entirely new in the art, so far as applicants are aware.

We therefore do not intend to be limited to the precise embodiments illustrated and described, as it will be at once apparent to those skilled in the art that the invention is susceptible of wide variation and application.

What we claim, therefore, and desire to secure by Letters Patent is:

1. In apparatus of the class described, the combination of a single sound record adapted to be reproduced for transcription to written form and containing, in indeterminate text and sequence, one or more imperfect primary recordings and one or more secondary recordings, said secondary recordings comprising changes to be made in said primary recordings to correct the imperfections therein; a control record comprising a slip having indices spaced therealong to correspond generally to the points on said sound record where said secondary recordings begin; and mechanism controlled by the indices of said control record for stopping reproduction from said sound record at points anterior to the endings of the primary recordings immediately preceding the secondary recordings to which the indices respectively correspond, so as to facilitate incorporation in the written transcript of the required changes in the primary recordings as set forth in the secondary recordings to effect production of the written transcript in the determinate text and sequence desired.

2. In a sound reproducing machine adapted to receive a record and having a reproducing element adapted to traverse said record, the combination of a recessed index receiver, an index strip for said record mounted on said receiver and having one or more index openings spaced therealong to correspond to the part of the record to which the index is correlated, said strip being positioned so that the openings therein are disposed over the recess in said receiver when the strip is in position thereon, index responsive means including a part adapted to move through an index opening a distance substantially greater than the thickness of said strip and into the receiver recess, when an index opening is encountered during reproduction, and mechanism requiring appreciable movement for its actuation and connected to interrupt reproduction when said part moves said distance through an index opening.

3. Index responsive mechanism for phonographic reproducing apparatus, comprising a member adapted to receive a slip having index openings formed therein, said member being recessed at the portion thereof corresponding to the portion of said slip in which said index openings are formed, a part biased to enter the recess of said member but prevented from entry by the slip disposed between said part and said recess, and means arranged to exert a bias against said part which increases when said part encounters an index opening and moves into the recess in said slip receiving portion.

4. Index responsive mechanism for dictation reproducing machines having a reproducer carriage, a rotatable feed screw and a shiftable feed nut on said carriage engageable with said feed screw for moving the reproducer carriage along a dictation record, said mechanism comprising a holder for index slip having one or more openings serving as indicia correlated with the dictation record, index responsive means including a part adapted to enter an index opening in said slip, means for producing relative movement between the slip holder and said index responsive means, and means actuated by said part for disengaging the feed nut from said feed screw when said part reaches an index opening.

5. Index responsive mechanism as set forth in claim 4, wherein means operative independently of said index slip is provided for temporarily shifting said feed nut into contact with said feed screw.

6. An index responsive unit for a dictation reproducing machine having controllable reproducing means including means operative in one position to provide for reproduction and operative in another position to stop reproduction, said index responsive unit comprising a support, feeler means movably carried on said support, means biasing said feeler means to engage an apertured slip and to enter an aperture in said slip, means connecting said feeler means with said reproduction controlling means whereby when said feeler means enters an aperture in the slip said reproduction controlling means serves to stop reproduction, and means for placing said connecting means in a position to permit actuation of said reproduction controlling means and rendering said feeler means inoperative, so as to provide for resumption of reproduction, said biasing means comprising over-center spring means for biasing said feeler means to bear against the indexed portion of a slip and said over-center spring means serving to hold said feeler means away from the slip after the feeler means has been moved into a position spaced from said slip.

7. In index responsive means for commercial dictation reproducing machines having a movable carriage and means movable from one position to another for interrupting reproduction, a feeler arm movable into three positions, means connecting the latter to said interrupting means, means tending to move said arm in one direction from an intermediate position to move said interrupting means from said one position to the other to interrupt reproduction, said arm being movable in the opposite direction into a third position, said connecting means including lost motion means providing for movement of said interrupting means back to said one position while said arm is in its third position, and means for holding the arm in the latter position.

8. Index responsive mechanism for dictation reproducing machines having a reproducer carriage, a rotatable feed screw and a shiftable feed nut on said carriage engageable with said feed screw for moving the reproducer carriage along a dictation record, said mechanism comprising a holder for an index slip bearing one or more openings serving as indicia correlated with the dictation record, a support fixed to said carriage, an arm pivoted thereto and arranged to disengage said feed nut from said feed screw, said arm having a portion movable along a slip in said holder as said carriage is advanced along the record by the engagement of said feed nut with said rotatable feed screw, and means biasing said arm so that the latter disengages said feed nut from the feed screw whenever the said portion reaches an index opening in the slip.

9. An index responsive unit for dictation reproducing machines having a reproducing unit movable across a dictation record and means for stopping reproduction from said record, said index responsive device comprising a holder for an index slip, said slip having one or more openings therein constituting indicia, a pivoted finger adapted to enter an opening in said slip, said slip holder and said finger being mounted so that one moves with the reproducing unit while the other remains relatively stationary, whereby relative movement occurs between the slip and the finger whenever the unit is advanced along the dictation record, means operated by the pivotal movement of said finger whenever an index opening is encountered for actuating said reproduction stopping means, thereby stopping reproduction from said record, and toggle means serving to bias said finger to enter an index opening and to hold said finger in an inoperative position out of engagement with said slip whenever the finger is shifted into said inoperative position, thereby providing for a resumption of reproduction until said index opening has been passed.

10. In the use of dictation machines for recording and reproducing dictation to enable making a written transcription thereof, the method of predetermining the production of the written transcript in a text and sequence other than that of the original recording, which comprises: making a sound record of matter to be transcribed, said recording including both a main text and changes to be made therein during transcription, said main text and the changes therefor being recorded in indeterminate sequence on the same sound record; making an auxiliary change control record contemporaneously with the sound record and correlated generally to those points in the main text of the sound record where changes are to be made; reproducing the sound record to enable making a written transcript thereof as reproduction proceeds; causing reproduction from the sound record to be automatically stopped at the points therein determined by said change control record but generally in advance of those points of change in the main text to which said change control record is correlated; and thereafter resuming reproduction to determine the desired changes in text and to complete the written transcription in accordance therewith.

11. The combination with a phonographic reproducing machine having a rotatable part for rotating a sound record carried thereon, means for driving said rotatable part to cause rotation thereof, a reproducing element movable along said sound record, and means for driving said movable reproducing element while said rotatable part is in motion to reproduce said record for transcription to written form, of an index slip having index openings therein at points corresponding generally to parts of the record which must be changed in the written transcript, means for operatively supporting said slip during reproduction of the record, a shiftable element, means to produce relative movement between said element and said index slip whereby one traverses the other in advance of the movement of the reproducing element over the surface of the record, said element being adapted to encounter and enter any index opening in the slip, means actuated by movement of said last named element from an operative position into an index opening for disabling one of said driving means, and means for holding said disabling means in inoperative position to allow reproduction to proceed.

12. The combination with a phonographic reproducing machine having a rotatable part for rotating a sound record carried thereon, means for driving said rotatable part to cause rotation thereof, a reproducing element movable along said sound record, and means for driving said movable reproducing element while said rotatable part is in motion to reproduce said record for transcription to written form, of an index slip having index openings therein at points corresponding generally to parts of the record which must be changed in the written transcript, means for operatively supporting said slip during reproduction of the record, an element traversing the index slip in advance of the movement of the reproducing element over the surface of the record and adapted to encounter and enter any index opening in the slip, means actuated by movement of said last named element from an operative position into an index opening for disabling one of said driving means, and means for holding said disabling means in inoperative position to allow reproduction to proceed.

EUGENE P. GAILMARD.
ROGER C. JOHNSON.